United States Patent
Ogawa

(10) Patent No.: US 11,969,876 B2
(45) Date of Patent: Apr. 30, 2024

(54) ROBOT AND CONTROL METHOD OF ROBOT

(71) Applicant: Panasonic Intellectual Property Management Co., Ltd., Osaka (JP)

(72) Inventor: Kento Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1054 days.

(21) Appl. No.: 16/740,856

(22) Filed: Jan. 13, 2020

(65) Prior Publication Data

US 2020/0298414 A1 Sep. 24, 2020

(30) Foreign Application Priority Data

Mar. 19, 2019 (JP) ................................ 2019-051108

(51) Int. Cl.
*B25J 11/00* (2006.01)
*B25J 9/16* (2006.01)

(52) U.S. Cl.
CPC ......... *B25J 11/0005* (2013.01); *B25J 9/1664* (2013.01)

(58) Field of Classification Search
CPC ... B25J 11/0005; B25J 9/1664; G05D 1/0238; G05D 2201/0214; G05D 1/0251; G05D 1/0214; G05D 1/0223; G05D 1/0225; G05D 1/0276; G05D 2201/02
See application file for complete search history.

(56) References Cited

U.S. PATENT DOCUMENTS

| 10,963,493 | B1 * | 3/2021 | Hu ........................ G06N 3/042 |
| 11,684,886 | B1 * | 6/2023 | Ebrahimi Afrouzi ....................... B25J 11/0085 95/282 |
| 2005/0218292 | A1 | 10/2005 | Kawabe et al. |
| 2011/0144850 | A1 | 6/2011 | Jikihara |
| 2013/0184980 | A1 | 7/2013 | Ichikawa et al. |
| 2018/0307966 | A1 | 10/2018 | Ogawa |

(Continued)

FOREIGN PATENT DOCUMENTS

| JP | H07-325620 A | 12/1995 |
| JP | 2003-117866 A | 4/2003 |

(Continued)

OTHER PUBLICATIONS

Yusuke Takasago, et al., "Collaborative Cleaning with a Human Using an Interactive Communication Robot", IEICE Technical Report, Japan, The Institute of Electronics, Information and Comwunication Engineers, Oct. 4, 2012 (Oct. 4, 2012), vol. 112 No.233, p. 1-6.

*Primary Examiner* — Basil T. Jos
(74) *Attorney, Agent, or Firm* — GREENBLUM & BERNSTEIN, P.L.C.

(57) ABSTRACT

A processor determines, by referring to a memory, which of a plurality of behavior types a behavior type executed by a robot when a first sensor detects an obstacle is; determines a type of the obstacle detected by the first sensor; decides whether first behavior for increasing opportunities of interaction with the user or second behavior for handling the obstacle is performed, based on the behavior type executed by the robot when the first sensor detects the obstacle and the type of the obstacle detected by the first sensor; and controls the robot to cause the robot to execute the decided behavior.

8 Claims, 6 Drawing Sheets

(56) References Cited

U.S. PATENT DOCUMENTS

2019/0030723 A1  1/2019  Hayashi
2022/0024486 A1* 1/2022  Scott .................... G05D 1/0221

FOREIGN PATENT DOCUMENTS

| JP | 2005-288573 A | 10/2005 |
|----|---------------|---------|
| JP | 2014-002514   | 1/2014  |
| JP | 2014-502566 A | 2/2014  |
| JP | 5409924 B     | 2/2014  |
| JP | 2018-176383 A | 11/2018 |
| JP | 2019-005591 A | 1/2019  |
| WO | 2009/090807 A1| 7/2009  |
| WO | 2012/039280   | 3/2012  |
| WO | 2012/097109 A2| 7/2012  |

\* cited by examiner

FIG. 4

| CONTACT DATE AND TIME | CONTACTED PARTY | | | CONTACT CONTENT |
|---|---|---|---|---|
| | USER ID | KIND OF USER (ADULT/CHILD) | FACIAL EXPRESSION OF USER | |
| 2019/2/2 18:16:12 TO 2019/2/2 18:16:19 | 001 | CHILD | UNKNOWN | HITTING ROBOT |
| 2019/2/2 18:16:20 TO 2019/2/2 18:16:28 | 001 | CHILD | SMILE | STROKING ROBOT |
| 2019/2/2 18:16:21 TO 2019/2/2 18:16:23 | 001 | CHILD | SMILE | SAYING, "I LIKE YOU" |
| 2019/2/2 18:16:29 TO 2019/2/2 18:16:37 | 001 | CHILD | SAD FACE | LOOKING AT ROBOT |
| ... | ... | ... | ... | ... |
| 2019/2/2 19:23:46 TO 2019/2/2 19:23:59 | 002 | CHILD | SURPRISED FACE | BEING BESIDE ROBOT |
| 2019/2/2 19:24:29 TO 2019/2/2 19:25:02 | 003 | ADULT | UNKNOWN | OPERATING ROBOT BY REMOTE CONTROLLER |
| ... | ... | ... | ... | ... |
| 2019/2/3 17:53:34 TO 2019/2/3 17:53:45 | 001 | CHILD | EXPRESSIONLESS | CLAPPING |
| 2019/2/3 17:54:37 TO 2019/2/3 17:54:40 | 001 | CHILD | ANGRY FACE | SAYING, "I HATE YOU" |
| ... | ... | ... | ... | ... |

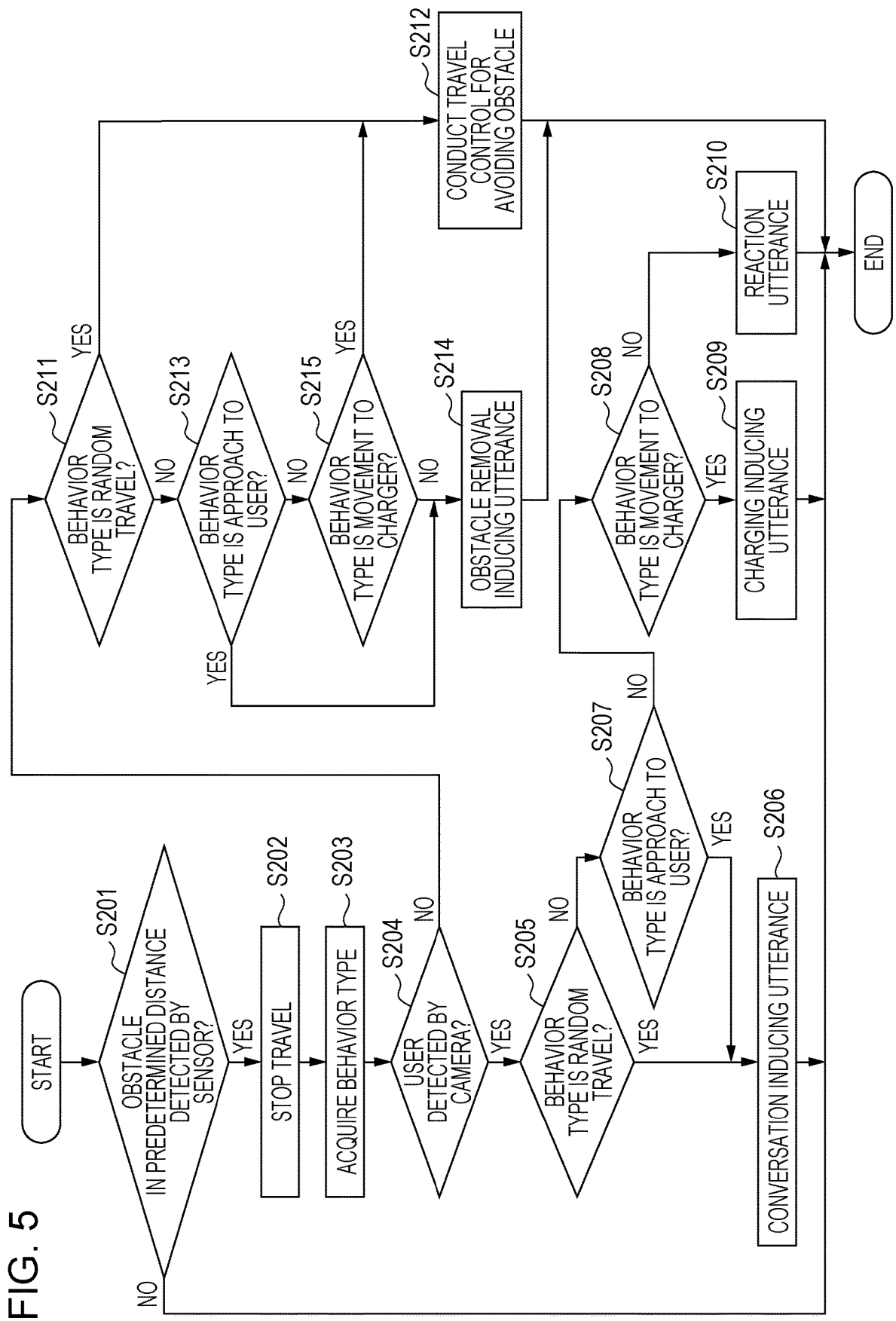

ROBOT AND CONTROL METHOD OF ROBOT

BACKGROUND

1. Technical Field

The present disclosure relates to a robot that mutually communicates with a user by interacting with the user and a control method of the robot.

2. Description of the Related Art

Techniques have been suggested in related art which decide behavior to be made by a robot in a case where the robot encounters a human.

For example, Japanese Patent No. 5409924 discloses a technique in which affinity of a human for a robot is calculated and an avoidance action of the robot and an expected avoidance action expected from the human are planned based on the affinity. Specifically, Japanese Patent No. 5409924 discloses that because the affinity of an elderly person for a robot tends to be low, the robot makes large avoidance not to cause the elderly person to have anxiety or discomfort (for example, paragraph [0015]).

Japanese Unexamined Patent Application Publication No. 2014-2514 discloses a technique in which in order to reduce a risk that a walking person loses walking balance or falls when the walking person reacts to a robot, avoidance behavior of the robot for the walking person is decided in accordance with motions of the legs of the walking person such that the walking person easily changes the direction (for example, paragraph [0016]).

SUMMARY

However, the above techniques in related art do not take into consideration an increase in opportunities of communication between a robot and a user at all, and further improvements have thus been demanded.

One non-limiting and exemplary embodiment provides a robot and a control method of a robot that may avoid an obstacle while increasing opportunities of communication between the robot and a user as much as possible.

In one general aspect, the techniques disclosed here feature a robot that mutually communicates with a user by interacting with the user. The robot includes a first sensor that detects an obstacle, a memory, and a processor. The memory stores a plurality of behavior types, each of the plurality of behavior types being a program for causing the robot to execute predetermined behavior, and the memory further stores a behavior type, which is executed by the robot, among the plurality of behavior types. The processor determines, by referring to the memory, which of the plurality of behavior types the behavior type executed by the robot when the first sensor detects the obstacle is; determines a type of the obstacle detected by the first sensor; decides whether first behavior for increasing opportunities of interaction with the user or second behavior for handling the obstacle is performed, based on the behavior type executed by the robot when the first sensor detects the obstacle and the type of the obstacle detected by the first sensor; and controls the robot to cause the robot to execute the decided behavior.

In the present disclosure, an obstacle may be avoided while opportunities of communication between a robot and a user are increased as much as possible.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram that illustrates one example of a data configuration of a contact information database;

FIG. 5 is a flowchart that illustrates an obstacle handling process in the robot according to the embodiment of the present disclosure.

DETAILED DESCRIPTION

Figure 1:
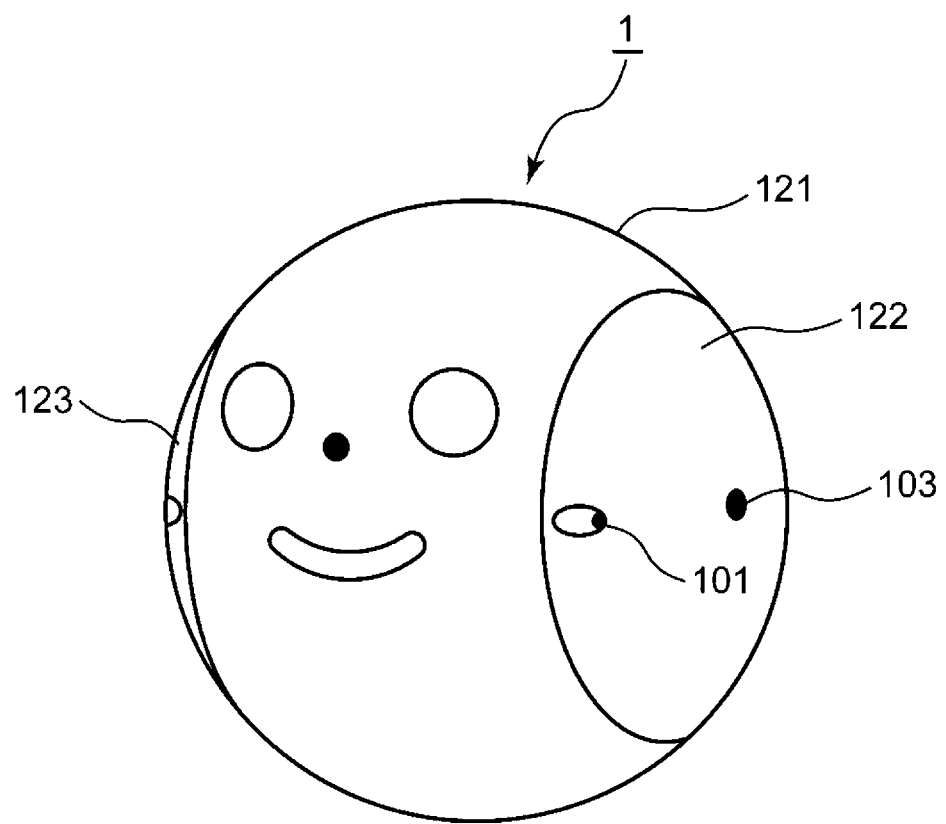
FIG. 1 is an external appearance perspective view of a robot according to an embodiment of the present disclosure.

Underlying Knowledge Forming Basis of One Aspect of the Present Disclosure

First, a description will be made about a viewpoint leading a performance of one aspect according to the present disclosure.

The inventor studies a robot for an infant that sometimes educates a user, sometimes scolds the user, and sometimes becomes a playmate of the user through communication with the user. It is important for such a robot to increase as much as possible opportunities of communication between the robot and the user such as touching, talking, staring, being beside, and remotely operating, for example. Meanwhile, the robot has to make behavior for avoiding an obstacle when the obstacle is detected.

However, in a case where the detected obstacle is the user, if the robot is caused to avoid the obstacle similarly to a case where the obstacle is an object other than the user, friendliness of the user to the robot lowers, and an increase in opportunities of communication between the robot and the user may thereby be hindered. Consequently, in a case where an obstacle is detected, such a robot does not simply make avoidance behavior but has to make appropriate behavior in consideration of whether or not the obstacle is the user.

Japanese Patent No. 5409924 and Japanese Unexamined Patent Application Publication No. 2014-2514 relate to behavior control methods of robots.

In Japanese Patent No. 5409924, as described above, in a case where a robot encounters a human, the robot makes behavior for planning an avoidance action of the robot and an expected avoidance operation expected of the human based on the affinity of the human for the robot.

Further, in Japanese Unexamined Patent Application Publication No. 2014-2514, as described above, when a robot encounters a walking person, the robot makes behavior for avoiding the walking person in accordance with motions of the legs of the walking person such that the walking person easily changes the direction.

However, Japanese Patent No. 5409924 only discloses that the robot performs avoidance behavior in consideration of the affinity for a human. Further, Japanese Unexamined Patent Application Publication No. 2014-2514 only discloses that in a case where the obstacle is a walking person, the robot performs avoidance behavior in consideration of easiness of change of direction by the walking person. Thus, in both Japanese Patent No. 5409924 and Japanese Unexamined Patent Application Publication No. 2014-2514, increasing opportunities of communication between the robot and the user as much as possible is not taken into consideration at all.

Accordingly, the inventor has obtained a finding that behavior of a robot is decided in accordance with information of a behavior type of the robot itself in obstacle detection (for example, random travel, approach to a user, movement to a charger, movement in conversation, and so forth) and information of an obstacle type (for example, a user, an object, and so forth) and the robot may thereby be caused to avoid an obstacle while opportunities of mutual communication between the robot and the user are increased as much as possible and has conceived the following aspects according to the present disclosure.

One aspect of the present disclosure provides a robot that mutually communicates with a user by interacting with the user, the robot including:
 a first sensor that detects an obstacle;
 a memory; and
 a processor, in which
  the memory stores a plurality of behavior types, each of the plurality of behavior types being a program for causing the robot to execute predetermined behavior,
  the memory further stores a behavior type, which is executed by the robot, among the plurality of behavior types, and
  the processor
   determines, by referring to the memory, which of the plurality of behavior types the behavior type executed by the robot when the first sensor detects the obstacle is,
   determines a type of the obstacle detected by the first sensor,
   decides whether first behavior for increasing opportunities of interaction with the user or second behavior for handling the obstacle is performed, based on the behavior type executed by the robot when the first sensor detects the obstacle and the type of the obstacle detected by the first sensor, and
   controls the robot to cause the robot to execute the decided behavior.

In this configuration, whether the first behavior for increasing opportunities of interaction with the user or the second behavior for handling the obstacle is performed is decided based on the behavior type executed by the robot when the first sensor detects the obstacle and the type of the obstacle detected by the first sensor, and the decided behavior is executed by the robot.

Accordingly, switching may appropriately be made between the first behavior for increasing interaction with the user and the second behavior for handling the obstacle in accordance with whether the type of the obstacle is the user or an object, for example. As a result, in this configuration, an obstacle may be avoided while opportunities of communication between the robot and the user are increased as much as possible.

In the above aspect, in a case where the behavior type executed by the robot when the first sensor detects the obstacle is behavior in which the robot moves toward the user and the type of the obstacle detected by the first sensor is an object other than the user, the processor may decide that the first behavior that indicates a desire for removal of the obstacle is performed.

In this configuration, when an object other than the user is detected in execution of behavior in which the robot moves toward the user, behavior for avoiding the obstacle is not simply made, but the first behavior that indicates the desire for removal of the obstacle by the user is made. Accordingly, the robot may avoid the obstacle while increasing opportunities of communication with the user.

In the above aspect, in a case where the behavior type executed by the robot when the first sensor detects the obstacle is behavior in which the robot moves toward the user and the type of the obstacle detected by the first sensor is the user, the processor may decide that the first behavior that induces conversation with the user is performed.

In this configuration, when the user is detected in execution of behavior in which the robot moves toward the user, behavior for avoiding the user is not made, but the first behavior that induces conversation with the user is made. Accordingly, opportunities of communication between the robot and the user may be increased under a circumstance in which the user is present around the robot.

In the above aspect, in a case where the behavior type executed by the robot when the first sensor detects the obstacle is behavior in which the robot moves toward a charging stand and the type of the obstacle detected by the first sensor is an object other than the user, the processor may decide that the second behavior for avoiding the obstacle is performed.

In this configuration, in a case where an object other than the user is detected while the robot is moving to the charging stand due to a power shortage, for example, the second behavior for avoiding the object is made. Thus, the robot may avoid the object and quickly move to the charging stand in a case of a power shortage, and battery exhaustion of the robot may be prevented.

In the above aspect, in a case where the behavior type executed by the robot when the first sensor detects the obstacle is behavior in which the robot moves toward a charging stand and the type of the obstacle detected by the first sensor is the user, the processor may decide that the first behavior that indicates a desire for movement of the robot to the charging stand is performed.

In this configuration, in a case where the user is detected while the robot is moving to the charging stand due to a power shortage, for example, behavior for avoiding the user is not made, but the first behavior that indicates, to the user, the desire for movement of the robot to the charging stand is made. Accordingly, it becomes possible to induce the user to perform behavior for carrying the robot to the charging stand, and battery exhaustion of the robot may be prevented while opportunities of communication with the user are increased.

In the above aspect, in a case where the behavior type executed by the robot when the first sensor detects the obstacle is behavior in which the robot moves at random and the type of the obstacle detected by the first sensor is an object other than the user, the processor may decide that the second behavior for avoiding the obstacle is performed.

In this configuration, in a case where an object other than the user is detected as the obstacle in random travel, the second behavior for avoiding the object is made. Accordingly, for example, under a circumstance in which the possibility that the user is not present around the robot is high and the necessity for the robot and the user to have communication is low, a situation may be prevented in which the robot collides with an object other than the user and both or either one of those are damaged.

In the above aspect, in a case where the behavior type executed by the robot when the first sensor detects the obstacle is behavior in which the robot moves at random and the type of the obstacle detected by the first sensor is the user, the processor may decide that the first behavior that induces conversation with the user is performed.

In this configuration, in a case where the user is detected as the obstacle in the random travel, the first behavior that induces conversation with the user is made. Accordingly, under a circumstance in which the user is not very highly interested in the robot, for example, the robot makes an approach to the user for communication and enables the user to respond to this approach, and opportunities of communication between the robot and the user may thereby be increased.

In the above aspect, in a case where the behavior type executed by the robot when the first sensor detects the obstacle is behavior in which the robot has conversation with the user and the type of the obstacle detected by the first sensor is an object other than the user, the processor may decide that the first behavior that indicates a desire for removal of the obstacle is performed.

In this configuration, in a case where an object is detected as the obstacle in conversation with the user, behavior for avoiding the obstacle is not made, but the first behavior that indicates the desire for removal of the obstacle is made. Accordingly, the robot is capable of encouraging the user to make behavior for removing the obstacle and may avoid the obstacle while having communication with the user.

In the above aspect, in a case where the behavior type executed by the robot when the first sensor detects the obstacle is behavior in which the robot moves forward when the robot has conversation with the user and the type of the obstacle detected by the first sensor is the user, the processor may decide that the first behavior in which the robot is delighted to come close to the user is performed.

In this configuration, in a case where the user is detected as the obstacle when the robot makes behavior for moving forward in conversation with the user, the robot may be caused to make the first behavior in which the robot is delighted to approach to the user. Accordingly, the user may be caused to feel friendliness, and opportunities of communication between the robot and the user may be increased.

In the above aspect, in a case where the behavior type executed by the robot when the first sensor detects the obstacle is behavior in which the robot moves at random, the type of the obstacle detected by the first sensor is the user, and the user is an adult, the processor may decide that the first behavior that indicates a desire for movement away from the robot is performed.

In this configuration, in a case where an adult user is detected as the obstacle in the random travel, the first behavior that indicates, to the user, the desire for movement away from the robot is made. Accordingly, the user may be avoided while communication with an adult is made.

In the above aspect, the robot may further include a camera that acquires information of surroundings of the robot, a microphone that acquires a sound of surroundings of the robot, and a second sensor that detects that the robot is touched by a human. In a case where the behavior type executed by the robot when the first sensor detects the obstacle is behavior in which the robot moves toward the user or behavior in which the robot moves at random, the type of the obstacle detected by the first sensor is the user, and a contact amount with the user that is calculated based on any of the information acquired by the camera, the sound acquired by the microphone, and a detection result by the second sensor is equal to or greater than a threshold value, the processor may decide that the second behavior in which the robot avoids the user is performed.

In this configuration, in a case where the user is detected as the obstacle in movement toward the user or in random travel and the contact amount between the user and the robot that is obtained from the information acquired by the camera, the sound acquired by the microphone, and the detection result by the second sensor that detects that the robot is touched by a human is equal to or greater than the threshold value, behavior for avoiding the user is made. Accordingly, for example, a demand of a guardian of the user who does not desire that the robot has more communication with the user because the contact amount between the user and the robot is the threshold value or greater may be met. Here, the contact amount is an amount that indicates the quantity of interaction between the user and the robot and is contact time, a contact frequency, or the like, for example. Contact includes not only physical contact such as touching and stroking but also indirect contact such as having a dialog and being beside.

In the above aspect, the first behavior that indicates the desire for movement away from the robot may include performing a gesture that indicates the desire for movement away from the robot.

In this configuration, because the gesture that indicates the desire for movement away from the robot is employed as the first behavior, the desire may be implied to the user.

In the above aspect, the robot may further include a speaker that outputs a sound, and a display that displays information. The first behavior that indicates the desire for movement away from the robot may include at least one of (i) outputting a sound that indicates the desire for movement away from the robot and (ii) outputting video that indicates the desire for movement away from the robot.

In this configuration, because the desire for movement away from the robot may be notified to the user by using either one of the sound and the video, the desire may accurately be notified to the user.

In the above aspect, the robot may further include a speaker that outputs a sound, and a display that displays information. The first behavior that indicates the desire for removal of the obstacle may include performing a gesture that indicates the desire for removal of the obstacle.

In this configuration, because the gesture that indicates the desire for removal of the obstacle is employed as the first behavior, the desire may be implied to the user.

In the above aspect, the robot may further include a speaker that outputs a sound, and a display that displays information. The first behavior that indicates the desire for removal of the obstacle may include at least one of (i) outputting a sound that indicates the desire for removal of the obstacle from the speaker and (ii) displaying information that indicates the desire for removal of the obstacle on the display.

In this configuration, because the desire for removal of the obstacle may be notified to the user by using either one of the sound and the video, the desire may accurately be notified to the user.

In the above aspect, the first behavior that induces conversation with the user may include at least one of (i) causing the robot to make contact with the user and (ii) swinging the robot in a left-right direction.

In this configuration, because behavior in which the robot makes contact with the user or the robot performs an action of swaying in the left-right direction is employed as the first behavior that induces conversation with the user, conversation with the user may be induced by causing the robot to make an action like asking for something.

In the above aspect, the robot may further include a speaker that outputs a sound, a display that displays information, and a microphone that acquires a sound of surroundings of the robot. The first behavior that induces conversation with the user may include at least one of (i) outputting a sound that induces conversation with the user from the speaker, (ii) directing the display toward the user, and (iii) directing the microphone toward the user.

In this configuration, indication of intention of conversation may accurately be notified to the user through at least one of the sound and the video, and utterance from the user may accurately be acquired by directing the microphone to the user.

In the above aspect, the first behavior that indicates the desire for movement of the robot to the charging stand may include performing a gesture that indicates the desire for movement of the robot to the charging stand.

In this configuration, because the gesture that indicates the desire for movement to the charging stand is employed as the first behavior, the desire may be implied to the user.

In the above aspect, the robot may further include a speaker that outputs a sound, and a display that displays information. The first behavior that indicates the desire for movement of the robot to the charging stand may include at least one of (i) outputting a sound that indicates the desire for movement of the robot to the charging stand from the speaker and (ii) displaying information that indicates the desire for movement of the robot to the charging stand on the display.

In this configuration, because the desire for movement to the charging stand may be notified to the user by using either one of the sound and the video, the desire may accurately be notified to the user.

In the above aspect, the first behavior in which the robot is delighted to come close to the user may include performing a gesture that indicates that the robot is delighted to come close to the user.

In this configuration, through the gesture of delight of coming close to the user, the delight is notified to the user, and the delight may thus be implied to the user.

In the above aspect, the robot may further include a speaker that outputs a sound, and a display that displays information. The first behavior in which the robot is delighted to come close to the user may include at least one of (i) outputting a sound that indicates that the robot is delighted to come close to the user from the speaker and (ii) displaying information that indicates that the robot is delighted to come close to the user on the display.

In this configuration, because the delight of coming close to the user may be notified to the user by using either one of the sound and the video, the delight may accurately be notified to the user.

The present disclosure may also be realized as a program that causes a computer to execute each of characteristic configurations included in such a robot or as a control method of a robot that acts by the program. Further, it is matter of course that such a program may be distributed via a computer-readable and non-transitory recording medium such as a CD-ROM or a communication network such as the Internet.

Embodiment

An embodiment of the present disclosure will hereinafter be described with reference to drawings. The embodiment described in the following illustrates one specific example of the present disclosure. Values, shapes, configuration elements, steps, orders of steps, and so forth that are described in the following embodiment are examples and are not intended to limit the present disclosure. Further, the configuration elements that are not described in the independent claims which provide the most superordinate concepts among the configuration elements in the following embodiment will be described as arbitrary configuration elements.

First, details of an external appearance of a robot according to the embodiment of the present disclosure will be described with reference to FIG. 1 and FIG. 2. FIG. 1 is an external appearance perspective view of the robot according to the embodiment of the present disclosure, and FIG. 2 is an internal perspective view of the robot according to the embodiment of the present disclosure.

As illustrated in FIG. 1, a robot 1 includes a spherical main housing 121, a first spherical cap portion 122, and a second spherical cap portion 123. The main housing 121, the first spherical cap portion 122, and the second spherical cap portion 123 configure a sphere as the whole. That is, the robot 1 has a spherical shape. The robot 1 makes contact with a user while two-dimensionally moving in a predetermined space. The first spherical cap portion 122 and the second spherical cap portion 123 are coupled together by a shaft (not illustrated) provided to the main housing 121. By contrast, the shaft is not fixed to the main housing 121. Consequently, the robot 1 moves forward or rearward by rotating the main housing 121 about the shaft.

Further, as illustrated in FIG. 1, the robot 1 includes a camera 101 and a microphone 103 in the first spherical cap portion 122. In addition, a speaker 113 is provided in an internal portion of the main housing 121. The speaker 113 outputs sounds of the robot 1. The camera 101 acquires video of a surrounding environment of the robot 1. The microphone 103 acquires sounds of the surrounding environment of the robot 1. Note that the speaker 113 may be provided to either of the first spherical cap portion 122 and the second spherical cap portion 123. In this embodiment, the robot 1 includes the camera 101 in the first spherical cap portion 122, but this embodiment is not limited to this. The camera 101 may be included in at least one of the first spherical cap portion 122 and the second spherical cap portion 123, the arrangement place and the number of cameras 101 are adjusted, and it thereby becomes possible to acquire video of 360 degrees around the robot 1. In this embodiment, the robot 1 includes the microphone 103 in the first spherical cap portion 122, but this embodiment is not limited to this. The microphone 103 may be included in at least one of the first spherical cap portion 122 and the second spherical cap portion 123.

Figure 2:
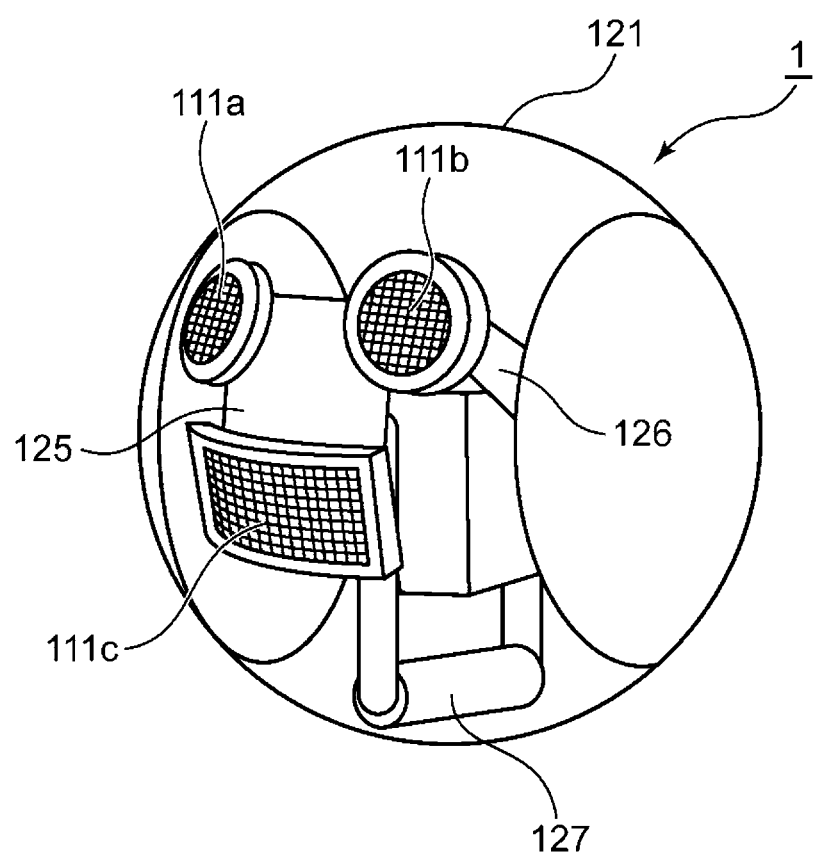
FIG. 2 is an internal perspective view of the robot according to the embodiment of the present disclosure.

As illustrated in FIG. 2, the robot 1 includes a first display 111a, a second display 111b, and a third display 111c in an internal portion of the main housing 121. The first display 111a, the second display 111b, and the third display 111c are installed in a fixing metal plate 125. The fixing metal plate 125 is mounted on the shaft via an arm 126. The first display 111a, the second display 111b, and the third display 111c are configured with plural light emitting diodes, for example. The first display 111a, the second display 111b, and the third display 111c display a facial expression of the robot 1. Specifically, the first display 111a, the second display 111b, and the third display 111c individually control lighting of the plural light emitting diodes and thereby display part of a face of the robot 1 as illustrated in FIG. 1, for example, eyes and a mouth. In the examples of FIG. 1 and FIG. 2, the first display 111a displays an image of the right eye, the second display 111b displays an image of the left eye, and the third display 111c displays an image of the mouth. Further, the images of the right eye, the left eye, and the mouth pass through the main housing 121 formed of a transparent or translucent member and are projected to the outside.

As illustrated in FIG. 2, the robot 1 includes a weight 127 in a lower portion of the internal portion of the main housing 121. Thus, the center of gravity of the robot 1 is positioned at a lower portion of the center of the main housing 121. Accordingly, the action of the robot 1 may be stabilized.

Figure 3:
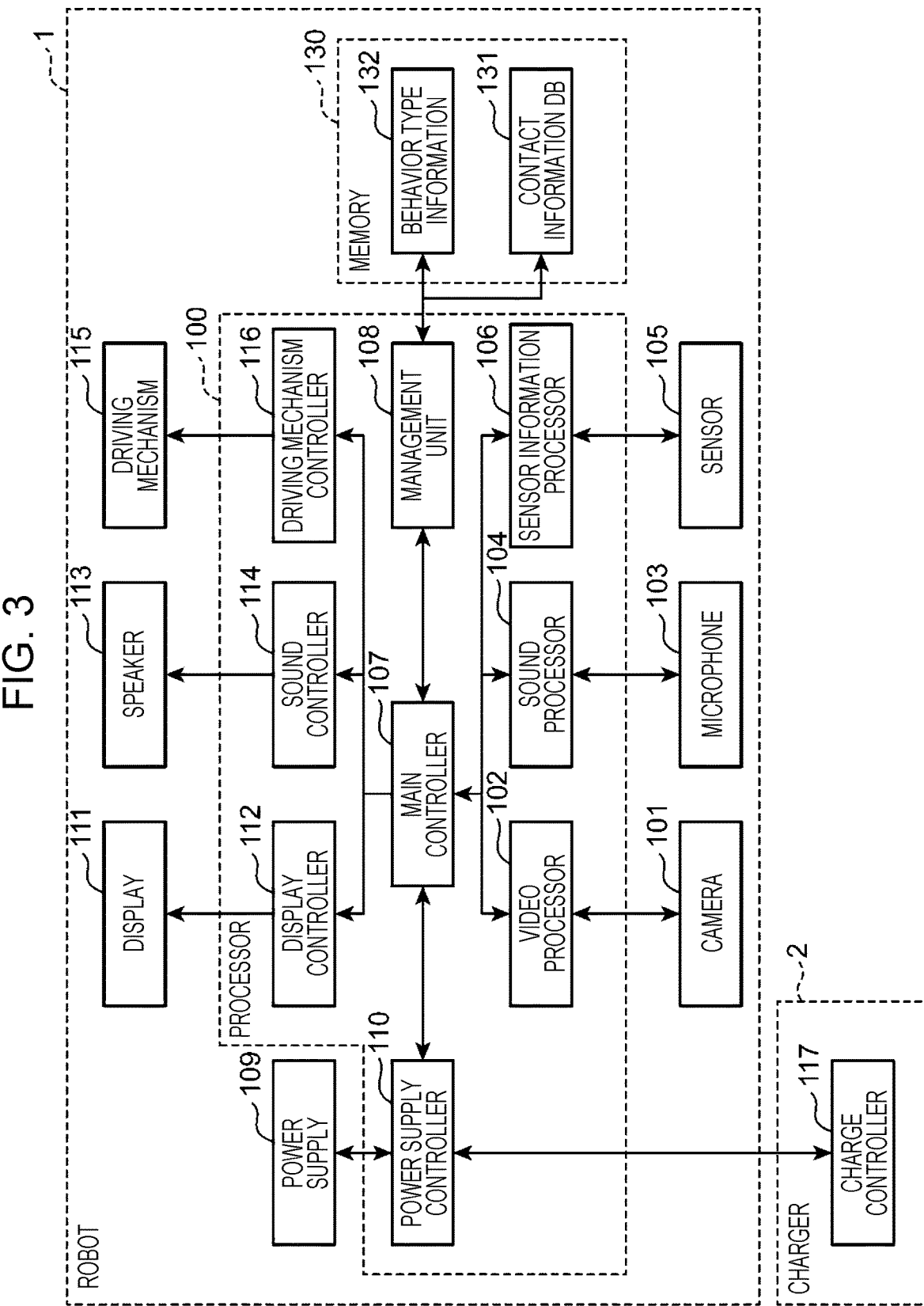
FIG. 3 is a block diagram that illustrates the robot according to the embodiment of the present disclosure and a charger used for charging the robot.

Next, details of an internal circuit of the robot 1 according to the embodiment of the present disclosure will be described with reference to FIG. 3. FIG. 3 is a block diagram that illustrates the robot 1 according to the embodiment of the present disclosure and a charger 2 used for charging the robot 1.

As illustrated in FIG. 3, the robot 1 includes the camera 101, the microphone 103, a sensor 105, a power supply 109, a display 111, the speaker 113, a driving mechanism 115, a processor 100, and a memory 130. The processor 100 includes a video processor 102, a sound processor 104, a sensor information processor 106, a main controller 107, a management unit 108, a power supply controller 110, a display controller 112, a sound controller 114, and a driving mechanism controller 116. Further, the charger 2 includes a charge controller 117. The processor 100 is an electric circuit such as a CPU, for example, and the memory 130 is a non-volatile semiconductor memory, for example.

The camera 101 acquires video of the surrounding environment of the robot 1. The microphone 103 acquires sounds of the surrounding environment of the robot 1. The sensor 105 is configured with a distance sensor, a thermal image sensor, an illuminance sensor, a gyro sensor, an acceleration sensor, a geomagnetic sensor, a pressure-sensitive sensor, a proximity sensor, a fingerprint authentication sensor, a vein authentication sensor, and so forth, for example. Information acquired by the sensor 105 includes information that indicates the surrounding environment of the robot 1, user operation information for the robot 1, and so forth. The information that indicates the surrounding environment is obtained from the distance sensor, the thermal image sensor, the illuminance sensor, and so forth, for example. The operation information is obtained from the gyro sensor, the acceleration sensor, the geomagnetic sensor, the pressure-sensitive sensor, the proximity sensor, the fingerprint authentication sensor, the vein authentication sensor, and so forth, for example. Note that the distance sensor, the thermal image sensor, and the fingerprint authentication sensor that configure the sensor 105, the camera 101, and the microphone 103 are examples of a first sensor for detecting an obstacle. Further, the gyro sensor, the acceleration sensor, the geomagnetic sensor, the pressure-sensitive sensor, the proximity sensor, the fingerprint authentication sensor, and the vein authentication sensor that configure the sensor 105 are examples of a second sensor that detects that the robot is touched by a human.

The video processor 102 analyzes a type of an obstacle (for example, a user, an object, and so forth), a position of the obstacle, a size of the obstacle, a kind of a facial expression in a case where the obstacle is the user, and attribute information (for example, a user ID, an age, and so forth) from the video acquired by the camera 101, stores analysis results as video analysis results in the memory 130, and thereby manages the video analysis results. Kinds of facial expressions include positive expressions such as "smiling face" and "surprised face" and negative expressions such as "sad face" and "worried face", for example.

The sound processor 104 analyzes presence or absence of a sound of the user, a kind of a sound, and attribute information (for example, a user ID, an age, and so forth) from the sound acquired by the microphone 103, stores analysis results as sound analysis results in the memory 130, and thereby manages the sound analysis results. Kinds of sounds include positive expression such as "I like you" and "play more" and negative expressions such as "I hate you" and "go away", for example.

The sensor information processor 106 analyzes a type of an obstacle (for example, a user, an object, and so forth), a position of the obstacle, a size of the obstacle, the distance from the robot 1 to the obstacle, and so forth from the information that is obtained by the sensor 105 and indicates the surrounding environment. Further, the sensor information processor 106 analyzes an operation time, an operation frequency, and a kind of an operation by the user, for example, from the operation information acquired by the sensor 105. Then, the sensor information processor 106 stores those analysis results as sensor analysis results in the memory 130 and thereby manages the sensor analysis results. Kinds of operations include positive expressions such as "touching" and "stroking" and negative expressions such as "hitting" and "flicking", for example. The kind of an operation is identified based on a waveform pattern of the pressure-sensitive sensor that configures the sensor 105, for example.

For example, an obstacle is detected from the information obtained by the sensor information processor 106, the video that includes the obstacle is analyzed by the video processor 102, and the type of the obstacle, that is, whether the obstacle is an object or the user, is thereby analyzed. Further, in a case where the type of an obstacle is the user, the video that includes the user is analyzed (for example, face authentication, a facial expression detection process, and so forth) by the video processor 102, and the facial expression of the user, the attribute information of the user, and so forth are thereby analyzed.

However, this is one example, and the attribute information of the user may be acquired by voiceprint authentication, which is performed by the sound processor 104, of the sound acquired by the microphone 103, for example, or the attribute information of the user may be acquired by an analysis, which is performed by the sensor information processor 106, of the information acquired by the fingerprint authentication sensor or the vein authentication sensor that configures the sensor 105. Further, distinction of whether the obstacle is an object or the user may be performed by an analysis, which is performed by the sensor information processor 106, of the temperature distribution of the obstacle that is indicated by the information acquired by the thermal image sensor which configures the sensor 105, for example.

Further, the robot 1 is charged by the charger 2. The power supply 109 is a secondary battery such as a lithium-ion battery that is charged by the charger 2, for example, and is an electric power supply of the robot 1. The power supply controller 110 manages the power stored in the power supply 109 by control by the charge controller 117 of the charger 2.

Specifically, the power supply controller 110 stores a charging flag that represents whether the power state of the robot 1 is on charge and information of the remaining power amount of the power supply 109 in the memory 130 and thereby manages the power supply 109. In addition, the power supply controller 110 reads out the charging flag and the information of the remaining power amount from the memory 130 and outputs those to the main controller 107. In addition, the power supply controller 110 controls the charge to the power supply 109 together with the charge controller 117 of the charger 2 in a case where the robot 1 is connected with the charger 2.

The management unit 108 stores behavior type information 132 that indicates a present behavior type of the robot 1 in the memory 130 and thereby manages the behavior type of the robot 1. In this embodiment, for example, the behavior types are categorized into four types of random travel, approach to the user, movement to the charger, and movement in conversation. However, the present disclosure is not limited to this, but the behavior types may be categorized into three types or five types or more. Further, the behavior types are not limited to the above-described four types, but other behavior types may be employed.

Here, random travel is travel of the robot 1 in which the robot 1 moves forward or rearward at random, turns left or right, and changes a traveling speed, for example. The random travel is the behavior type executed under a circumstance in which a task is not given to the robot 1, for example, and is a basic state of the robot 1. Accordingly, the robot 1 autonomously behaves even under a circumstance in which a task is not given and may thereby acts as if the robot 1 were a pet. Note that a task is work assigned to the robot 1 in order to achieve a certain purpose, for example, conversation with the user, approach to the user, movement to a charging stand, and so forth.

Approach to the user is approach to the side of the user in a case where the robot 1 finds the user, for example. The approach to the user is executed in a case where the robot 1 detects the user in the random travel, for example. Movement to the charger 2 is executed in a case where the remaining power amount of the power supply 109 becomes a predetermined value or less. In the movement to the charger 2, the robot 1 searches for the charger 2 and moves to the charger 2 in order to charge the power supply 109. Note that the movement to the charger 2 is executed in preference to the other behavior types in order to prevent battery exhaustion of the robot 1, for example.

Movement in conversation is movement of the robot 1 in a case where the robot 1 has conversation with the user, for example. The robot 1 has conversation with the user by executing a dialog program or a play program that is in advance installed and is configured with predetermined facial expressions, sounds, and motions. Here, the dialog program includes self-introduction, greetings, a weather forecast, schedule confirmation, a chat, and so forth, which are targeted for children, for example. The play program includes word-chain game, quiz, rock paper scissors, reading of a picture book or the like, care play, singing, hide and seek, encouragement of living habits, and so forth, which are targeted for children, for example.

In addition, the management unit 108 accumulates contact information that is a history of contact between the robot 1 and the user in a contact information database (DB) 131 and manages the contact information. FIG. 4 is a diagram that illustrates one example of a data configuration of the contact information database 131. The contact information database 131 is a database in which one piece of contact information is allocated to one row and stores information about the user as a contacted party of the robot 1 and a contact content while associating those together.

Here, "contact" indicates a situation in which the user is beside the robot 1, the user looks at the robot 1, the user talks with the robot 1, the user touches the robot 1, or the user remotely operates the robot 1 by a remote controller operation, a gesture operation, a sound of clapping, or the like. That is, "contact" not only indicates physical contact between the user and the robot 1 but also includes indirect contact between the user and the robot 1 and indicates interaction between the user and the robot to have communication.

Specifically, the contact information DB 131 stores "contact date and time", "contacted party", and "contact content" while associating those together. "Contact date and time" indicates a start time and an end time in contact between the robot 1 and the user. The time from the start time to the end time stored in "contact date and time" becomes the contact time between the robot 1 and the user.

"Contacted party" indicates information about the user who makes contact with the robot 1 and includes columns of "user ID", "kind of user", and "facial expression of user". "User ID" is an identifier of the user who makes contact with the robot 1. "User ID" is in advance allotted to each of one or more users who live in a house in which the robot 1 is present, for example. The management unit 108 acquires the user ID indicated by the video analysis results by the video processor 102 via the main controller 107 and records the user ID in the column of "user ID".

"Kind of user" is attribute information of the user who makes contact with the robot 1. Here, as "kind of user", for example, a child or an adult is employed. However, this is one example, and attribute information such as mother, father, eldest son, and eldest daughter may be employed, age may be employed, or male or female may be employed, for example. The management unit 108 acquires the kind of user included in the video analysis results by the video processor 102 via the main controller 107 and records the kind of user in the column of "kind of user".

"Facial expression of user" indicates a kind of a facial expression of the user in contact between the robot 1 and the user. Here, "facial expression of user" includes positive expressions such as "smile" and "surprised face" and negative expressions such as "sad face", "worried face", and "angry face", for example. The management unit 108 acquires the kind of a facial expression included in the video analysis results by the video processor 102 via the main controller 107 and records the kind of a facial expression in the column of "facial expression of user".

"Contact content" indicates a content of contact between the user and the robot 1. Here, "contact content" includes operations to the robot 1 by the user such as "hitting the robot", "stroking the robot", "rubbing the robot", and "operating the robot by a remote controller", utterance contents of the user to the robot 1 such as "I like you", "play more", "I hate you", and "go away", and so forth, for example. In addition, "contact content" includes behavior to the robot 1 by the user, for example, to have interaction such as "looking at the robot", "being beside the robot", and "clapping". The management unit 108 acquires the kind of an operation included in the sensor analysis results by the sensor information processor 106, the kind of a sound included in the sound analysis results by the sound processor 104, and the kind of a facial expression included in the video analysis results by the video processor 102 via the main controller 107, for example, and records those kinds in the column of the contact content.

In addition to those, the contact information database 131 may include columns such as contact time and contact frequency between the robot 1 and the user. The contact time may be obtained as the difference between the recorded start time and the recorded end time in the column of "contact date and time". The contact frequency is a frequency of operations to the robot 1 by the user in one piece of contact. For example, the contact frequency of "hitting the robot" is the frequency of hitting on the robot 1 by the user, and the contact frequency of "stroking the robot" is the frequency of stroking on the robot 1 by the user.

The display 111 is configured with the first display 111a, the second display 111b, and the third display 111c, which are illustrated in FIG. 2. The display 111 is configured with plural light emitting diodes that are aligned at predetermined intervals, for example, and outputs display information that indicates the facial expression of the robot 1. Specifically, the display 111 individually controls lighting of the plural light emitting diodes and thereby displays part of the face of the robot 1, for example, the eyes and the mouth.

The display controller 112 outputs a display signal for outputting the display information, which corresponds to a behavior control command output from the main controller 107, from the display 111. Accordingly, the display 111 outputs a facial expression of the robot 1.

The sound controller 114 outputs a sound signal for outputting a sound, which corresponds to the behavior control command output from the main controller 107, from the speaker 113. Accordingly, the speaker 113 outputs a sound of the robot 1.

The driving mechanism 115 is configured with plural motors, a frame, gears, a driving belt, the shaft, and so forth, for example, and causes the robot 1 to act. Specifically, the driving mechanism 115 controls the plural motors and thereby changes the direction of the face of the robot 1 or causes the robot 1 to move.

Referring to FIG. 2, for example, the plural motors include a first motor that rotates the main housing 121 and causes the robot 1 to travel, a second motor that rotates the weight 127 about the front-rear direction and inclines the posture of the robot 1 about the left-right direction, and a third motor that rotates the arm 126 about the shaft and inclines the eyes and the mouth of the robot 1 upward or downward. The frame is suspended from the shaft and houses the plural motors, gears, and the driving belt. The plural gears have the driving belt wound around those and transmit the rotational force of the third motor to the arm 126.

Specifically, the driving mechanism 115 drives the first motor to the third motor in accordance with a driving signal from the driving mechanism controller 116, thereby causes the robot 1 to travel, causes the robot 1 to make a turn, and inclines the eyes and the mouth of the robot 1 upward or downward. Note that the robot 1 makes a right turn by moving forward while inclining the weight 127 in the right direction when the front side is seen from the rear side and makes a left turn by moving forward while inclining the weight 127 in the left direction.

The driving mechanism controller 116 outputs a control signal for operating the driving mechanism 115 of the robot 1 in accordance with the behavior control command output from the main controller 107. Accordingly, the driving mechanism 115 causes the robot 1 to perform the action that corresponds to the behavior control command.

The main controller 107 acquires the video analysis results from the video processor 102. The main controller 107 acquires the sound analysis results of the user from the sound processor 104. The main controller 107 acquires the sensor analysis results from the sensor information processor 106. The main controller 107 acquires the behavior type information 132 from the management unit 108.

The main controller 107 decides "contact date and time", "contacted party", and "contact content" from a recognition result of the user included in the video analysis results acquired from the video processor 102, a sound recognition result of the user acquired from the sound processor 104, and an operation recognition result of the user acquired from the sensor information processor 106, generates the contact information, and outputs the contact information to the management unit 108. In addition, the main controller 107 acquires the contact information of the user as the contacted party from the management unit 108 in an obstacle handling process that will be described later.

The main controller 107 acquires the charging flag of the power state of the power supply 109 and information of the remaining power amount from the power supply controller 110.

The main controller 107 generates the behavior control command based on the video analysis results from the video processor 102, the sensor analysis results from the sensor information processor 106, and information acquired from the management unit 108 and outputs the behavior control command to the display controller 112, the sound controller 114, and the driving mechanism controller 116. Details of contents of the behavior control command will be described later.

The main controller 107 periodically acquires the charging flag from the power supply controller 110 and performs the obstacle handling process, which will be described with reference to FIG. 5, in a case where the charging flag is OFF, that is, in a case where the power state of the robot 1 is not on charge. Note that the condition for performing the obstacle handling process is not limited to this. For example, the main controller 107 may further periodically acquire information of the remaining power amount of the power supply 109 from the power supply controller 110 in addition to the charging flag and may perform the obstacle handling process, which will next be described, in a case where the charging flag is OFF and the remaining power amount indicated by the information of the remaining power amount is a predetermined value or greater.

Next, the obstacle handling process in the robot 1 according to the embodiment of the present disclosure will be described with reference to FIG. 5. FIG. 5 is a flowchart that illustrates the obstacle handling process in the robot 1 according to the embodiment of the present disclosure.

First, the main controller 107 acquires the sensor analysis results from the sensor information processor 106 and determines whether or not an obstacle is detected by the sensor 105 in a predetermined distance from the robot 1 (S201). The predetermined distance is a distance determined in advance in which the robot 1 is capable of interacting with the user.

In a case where an obstacle is not detected by the sensor 105 in the predetermined distance from the robot 1 (a case of "No" in S201), the main controller 107 terminates the obstacle handling process.

On the other hand, in a case where an obstacle is detected by the sensor 105 in the predetermined distance from the robot 1 (a case of "Yes" in S201), the main controller 107 outputs the behavior control command for stopping travel of the robot 1 to the driving mechanism controller 116 (S202). In this case, in addition to this behavior control command, the main controller 107 may output, to the display controller 112 and the sound controller 114, the behavior control command for lighting the plural light emitting diodes of the display 111 that are positioned at the coordinates for reproducing a predetermined facial expression (for example, a surprised face, a sad face, and so forth) and the behavior control command for causing the robot 1 to utter a predetermined sound (for example, "oops", "that was close", "something might be there", and so forth), respectively.

Next, the main controller 107 acquires, from the management unit 108, the behavior type information 132 (for example, random travel, approach to the user, movement to the charger, movement in conversation, and so forth) of the robot 1 immediately before stop of travel of the robot 1 in step S202 (S203).

Next, the main controller 107 determines whether or not the type of the obstacle detected in step S201 is the user from the types of obstacles (for example, the user, an object, and so forth) included in the video analysis results about the video acquired by the camera 101, the types of obstacles being acquired from the video processor 102 (S204).

In this flow, in S204, the main controller 107 only distinguishes whether the obstacle is a person or an object and does not have to specify the attribute information of the user such as the user ID. However, this is one example. In a case where a mode is employed which will be described later and in which the contact information DB 131 is referred to, the main controller 107 specifies the attribute information of the user in S204.

Further, in this flow, as indicated in step S201 and step S204, detection of an obstacle and detection of the user are separately conducted. However, this is one example, and detection of an obstacle and the detection of the user may simultaneously be conducted in step S201.

For example, in step S201, in a case where an obstacle is detected by the sensor 105, the main controller 107 may cause the video processor 102 to analyze the video of the camera 101, acquire the video analysis results from the video processor 102, and thereby determine whether or not the obstacle detected by the sensor 105 is the user.

Alternatively, in step S201, it is assumed that when the obstacle is detected by the sensor 105, the user as the obstacle utters. In this case, the main controller 107 may recognize the user from the attribute information included in the sound analysis results.

In a case where the determination result in step S204 indicates that the obstacle is the user (a case of "Yes" in S204), the main controller 107 determines whether or not the present behavior type of the robot 1 is "random travel" from the behavior type information 132 acquired in step S203 (S205).

In a case where the determination result in step S205 is "random travel" (a case of "Yes" in S205), the main controller 107 outputs the behavior control command, by which the robot 1 conducts "conversation inducing utterance" for the user, to the display controller 112 and the sound controller 114 (S206) and terminates the obstacle handling process.

A specific example of "conversation inducing utterance" in "random travel" is as follows. The main controller 107 outputs, to the display controller 112, the behavior control command for lighting the plural light emitting diodes of the display 111, which are positioned at the coordinates which enable reproduction of a facial expression of asking a favor (for example, both eyes in the shape of "^ ^" or the like) as illustrated in the first row and first column of table H6 in FIG. 6. Further, the main controller 107 outputs, to the sound controller 114, the behavior control command that causes the robot 1 to utter a sound with a content by which the robot 1 induces the user to become a partner of conversation such as "play with me", for example, as illustrated in the first row and first column of table H6 in FIG. 6. Then, when output of all the behavior control commands is completed, the main controller 107 terminates the obstacle handling process.

In such a manner, in this embodiment, in a case where the obstacle detected by the robot 1 is the user in "random travel", the robot 1 does not avoid the obstacle, that is, the user but performs "conversation inducing utterance" that encourages the user to have conversation. Accordingly, opportunities of communication between the robot 1 and the user may be increased as much as possible.

Note that the facial expressions and the sounds of the robot 1, which are described here, are examples, and the facial expressions and the sounds are not limited to those. For example, the main controller 107 may output only the behavior control command that causes the robot 1 to utter a sound to the sound controller 114. In this case, communication between the robot 1 and the user may be made only by the sound output from the speaker 113. Further, the main controller 107 may output only the behavior control command for displaying text information, in which the sound uttered by the robot 1 is displayed as text, as a facial expression to the display controller 112. In this case, communication between the robot 1 and the user may be made only by the text information displayed on the display 111. Further, the main controller 107 may output the behavior control command for outputting both a sound uttered by the robot 1 and the text information of the sound to the display controller 112 and the sound controller 114. In this case, communication between the robot 1 and the user may be made by using the sound and the text information.

Furthermore, in addition to the sound and the facial expression of the robot 1, the main controller 107 may output, to the driving mechanism controller 116, the behavior control command that causes the robot 1 to make a predetermined motion (for example, sway in the left-right direction, a nod in the up-down direction, and so forth). In this case, the robot 1 may more effectively induce the user to become a partner of conversation by using a motion as well. Further, the main controller 107 may output not only the behavior control command for inducing the user to become a partner of conversation but also the following behavior control commands. That is, the main controller 107 may output the behavior control commands for inducing communication without utterance, by which the robot 1 gently taps the user by a main body, the robot 1 directs the display 111 toward the user and thereby makes a facial expression of looking at the user, the robot 1 sways beside the user, the robot 1 directs the microphone 103 (ear portion) of the robot 1 in the direction toward the user, and so forth, for example.

On the other hand, in a case where the determination result in step S205 is not "random travel" (a case of "No" in S205), the main controller 107 determines whether or not the present behavior type of the robot 1 is "approach to the user" from the behavior type information 132 acquired in step S203 (S207).

In a case where the determination result in step S207 is "approach to the user" (a case of "Yes" in S207), the process moves to above-described step S206, "conversation inducing utterance" is performed, and the obstacle handling process is thereafter terminated.

On the other hand, in a case where the determination result in step S207 is not "approach to the user" (a case of "No" in S207), the main controller 107 determines whether or not the present behavior type of the robot 1 is "movement to the charger" from the behavior type information 132 of the robot 1 acquired in step S203 (S208).

In a case where the determination result in step S208 is "movement to the charger" (a case of "Yes" in S208), the main controller 107 outputs the behavior control command, by which the robot 1 conducts "charging inducing utterance" for the user, to the display controller 112 and the sound controller 114 (S209) and terminates the obstacle handling process.

A specific example of the charging inducing utterance is as follows. The main controller 107 outputs, to the display controller 112, the behavior control command for lighting the plural light emitting diodes of the display 111, which are positioned at the coordinates which enable reproduction of a facial expression of asking for help (for example, both eyes in the shape of "><" or the like) as illustrated in the third row and first column of table H6 in FIG. 6. Further, the main controller 107 outputs, to the sound controller 114, the behavior control command that causes the robot 1 to utter a sound with a content by which the robot 1 induces the user to carry and return the robot 1 to the charger 2 such as "return me to the charger", for example, as illustrated in the third row and first column of table H6 in FIG. 6. Then, when output of all the behavior control commands is completed, the main controller 107 terminates the obstacle handling process.

In such a manner, in this embodiment, in a case where the obstacle detected by the robot 1 is the user in "movement to the charger", the robot 1 does not avoid the obstacle, that is, the user but encourages the user to carry the robot 1 to the charger 2. Accordingly, opportunities of communication between the robot 1 and the user may be increased as much as possible.

Note that the facial expressions and the sounds of the robot 1, which are described here, are examples, and the facial expressions and the sounds are not limited to those. For example, the main controller 107 may output only the behavior control command that causes the robot 1 to utter a sound to the sound controller 114. In this case, communication between the robot 1 and the user may be made only by the sound output from the speaker 113. Further, the main controller 107 may output only the behavior control command for displaying text information, in which the sound uttered by the robot 1 is displayed as text, as a facial expression to the display controller 112. In this case, communication between the robot 1 and the user may be made only by the text information displayed on the display 111. Further, the main controller 107 may output the behavior control command for outputting both a sound uttered by the robot 1 and the text information of the sound to the sound controller 114 and the display controller 112. In this case, communication between the robot 1 and the user may be made by using the sound and the text information.

Furthermore, in addition to the sound and the facial expression of the robot 1, the main controller 107 may output, to the driving mechanism controller 116, the behavior control command that causes the robot 1 to make a predetermined motion (for example, sway in the left-right direction, a nod in the up-down direction, and so forth) and may thereby cause the robot 1 to perform a gesture that indicates that the robot 1 desires to be moved to the charger 2. In this case, the robot 1 may more effectively induce the user to carry the robot 1 to the charger 2 by using a motion as well.

On the other hand, in a case where the determination result in step S208 is not "movement to the charger" (a case of "No" in S208), that is, does not correspond to any of "random travel", "approach to the user", and "movement to the charger" but is "movement in conversation", the main controller 107 outputs the behavior control command, by which the robot 1 conducts reaction utterance for the user, to the display controller 112 and the sound controller 114 (S210) and terminates the obstacle handling process. The movement in conversation includes forward movement of the robot 1.

A specific example of the reaction utterance is as follows. The main controller 107 outputs, to the display controller 112, a command for lighting the plural light emitting diodes of the display 111, which are positioned at the coordinates which enable reproduction of a delighted facial expression (for example, both eyes in the shape of "^ ^" or the like) as illustrated in the fourth row and first column of table H6 in FIG. 6, as the behavior control command. Further, the main controller 107 outputs, to the sound controller 114, the behavior control command that causes the robot 1 to utter a sound as a reaction to the user such as "I am happy being beside you", for example, as illustrated in the fourth row and first column of table H6 in FIG. 6. Then, when output of all the behavior control commands is completed, the main controller 107 terminates the obstacle handling process.

In such a manner, in this embodiment, in a case where the obstacle detected by the robot 1 is the user in "movement in conversation", the robot 1 does not avoid the obstacle, that is, the user but performs "reaction utterance" to the user. Thus, opportunities of communication between the robot 1 and the user may be increased as much as possible.

Note that the facial expressions and the sounds of the robot 1, which are described here, are examples, and the facial expressions and the sounds are not limited to those. For example, the main controller 107 may output only the behavior control command that causes the robot 1 to utter a sound to the sound controller 114. In this case, communication between the robot 1 and the user may be made only by the sound output from the speaker 113. Further, only the behavior control command for displaying text information, in which the sound uttered by the robot 1 is displayed as text, as a facial expression may be output to the display controller 112. In this case, communication between the robot 1 and the user may be made only by the text information displayed on the display 111. Further, the main controller 107 may output the behavior control command for outputting both a sound uttered by the robot and the text information of the sound to the display controller 112 and the sound controller 114. In this case, communication between the robot 1 and the user may be made by using the sound and the text information.

Furthermore, in addition to the sound and the facial expression of the robot 1, the main controller 107 may output, to the driving mechanism controller 116, the behavior control command that causes the robot 1 to make a predetermined motion (for example, sway in the left-right direction, a nod in the up-down direction, and so forth) and may thereby cause the robot 1 to perform a gesture of being delighted to come close to the user. In this case, the robot 1 may more effectively perform the reaction to the user by using a motion as well.

On the other hand, in a case where the determination result in step S204 indicates that the obstacle is not the user (a case of "No" in S204), that is, a case where the obstacle is an object, the main controller 107 determines whether or not the behavior type information 132 acquired in step S203 is "random travel" (S211).

In a case where the determination result in step S211 is "random travel" (a case of "Yes" in S211), the main controller 107 outputs the behavior control command, by which the robot 1 travels while avoiding the obstacle, to the driving mechanism controller 116 (S212) and terminates the obstacle handling process. One example of an avoidance method of an obstacle is a method in which a stopping place of the robot 1 in step S202 is set as an initial point and the robot 1 moves rearward for a predetermined distance, thereafter turns left or right, and moves forward, for example. Another example of the avoidance method of an obstacle is a method, in which the robot 1 makes a turn by a predetermined angle at a present place and thereafter moves forward, or the like. Still another example of the avoidance method of an obstacle is a method, in which the robot 1 turns right or left without moving rearward, or the like. However, the present disclosure is not limited to those methods.

In such a manner, in this embodiment, in a case where the obstacle detected by the robot 1 is an object and the behavior type of the robot 1 in detection of the obstacle is behavior such as "random travel" or "movement to the charger" which is performed when whether the user is present around is unknown, it is difficult for the robot 1 to increase opportunities of communication with the user. Thus, the main controller 107 outputs the behavior control command for avoiding collision with an object as a minimum action to the driving mechanism controller 116. Accordingly, collision between the robot 1 and an object and damage to either one or both of those may be prevented.

Note that the behavior control command in a case of avoiding an obstacle is not limited to this. For example, in addition to this behavior control command, the main controller 107 may output, to the display controller 112 and the sound controller 114, the behavior control command for lighting the plural light emitting diodes of the display 111 that are positioned at the coordinates for reproducing a predetermined facial expression (for example, a surprised face, a sad face, and so forth) and the behavior control command for causing the robot 1 to utter a predetermined sound (for example, "oops", "that was close", "something might be there", and so forth), respectively.

On the other hand, in a case where the determination result in step S211 is not "random travel" (a case of "No" in S211), the main controller 107 determines whether or not the present behavior type of the robot 1 is "approach to the user" from the behavior type information 132 of the robot 1 acquired in step S203 (S213).

In a case where the determination result in step S213 is "approach to the user" (a case of "Yes" in S213), the main controller 107 outputs the behavior control command, by which the robot 1 conducts "obstacle removal inducing utterance" for the user, to the display controller 112 and the sound controller 114 (S214) and terminates the obstacle handling process.

A specific example of "obstacle removal inducing utterance" is as follows. The main controller 107 outputs, to the display controller 112, the behavior control command for lighting the plural light emitting diodes of the display 111, which are positioned at the coordinates which enable reproduction of a facial expression of asking for help (for example, both eyes in the shape of "><" or the like) as illustrated in the second row and second column of table H6 in FIG. 6. Further, the main controller 107 outputs, to the sound controller 114, the behavior control command that causes the robot 1 to utter a sound with a content by which the robot 1 induces the user to move the obstacle away such as "move the obstacle away", for example, as illustrated in the second row and second column of table H6 in FIG. 6. Then, when output of all the behavior control commands is completed, the main controller 107 terminates the obstacle handling process.

In such a manner, in this embodiment, in a case where the obstacle detected by the robot 1 is an object and the behavior of the robot 1 in detection of the obstacle is behavior such as "approach to the user" or "movement in conversation" which is performed when the possibility that the user is present around is high, "obstacle removal inducing utterance" that encourages the user to move the obstacle away is performed. Accordingly, opportunities of communication between the robot 1 and the user may be increased as much as possible.

Note that the facial expressions and the sounds of the robot 1, which are described here, are examples, and the facial expressions and the sounds are not limited to those. For example, the main controller 107 may output only the behavior control command that causes the robot 1 to utter a sound to the sound controller 114. In this case, communication between the robot 1 and the user may be made only by the sound output from the speaker 113. Further, the main controller 107 may output only the behavior control command for displaying text information, in which the sound uttered by the robot 1 is displayed as text, as a facial expression to the display controller 112. In this case, communication between the robot 1 and the user may be made only by the text information displayed on the display 111. Further, the main controller 107 may output the behavior control command for outputting both a sound and the text information of the sound to the display controller 112 and the sound controller 114. In this case, communication between the robot 1 and the user may be made by using the sound and the text information.

Furthermore, in addition to or instead of the sound and the facial expression of the robot 1, the main controller 107 may output, to the driving mechanism controller 116, the behavior control command that causes the robot 1 to make a predetermined motion (for example, sway in the left-right direction, a nod in the up-down direction, and so forth) and may thereby cause the robot 1 to perform a gesture that indicates that the robot 1 desires removal of the obstacle. In this case, the robot 1 may more effectively induce the user to remove the obstacle by using a motion as well.

On the other hand, in a case where the determination result in step S213 is not "approach to the user" (a case of "No" in S213), the main controller 107 determines whether or not the present behavior type of the robot 1 is "movement to the charger" from the behavior type information 132 acquired in step S203 (S215).

In a case where the determination result in step S215 is "movement to the charger" (a case of "Yes" in S215), the process moves to above-described step S212, behavior for avoiding the obstacle is executed, and the obstacle handling process is thereafter terminated.

On the other hand, in a case where the determination result in step S215 is not "movement to the charger" (a case of "No" in S215), that is, is not any of "random travel", "approach to the user", and "movement to the charger" but is "movement in conversation", the process moves to above-described step S214, the obstacle removal inducing utterance is executed, and the obstacle handling process is thereafter terminated.

Figure 6:
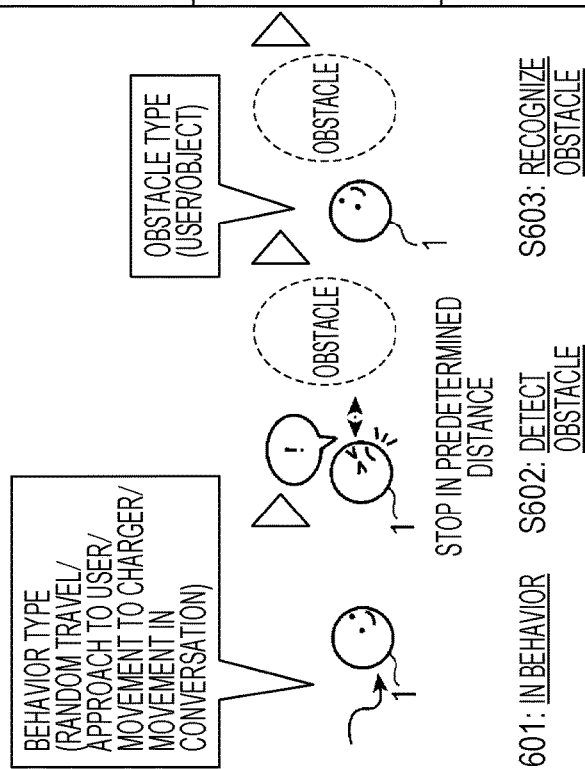
FIG. 6 is a diagram that summarizes the obstacle handling process.

Next, a summary of the obstacle handling process indicated by the flow of FIG. 5 will be described. FIG. 6 is a diagram that summarizes the obstacle handling process. The left side of FIG. 6 illustrates behavior of the robot 1 in a case where an obstacle is detected, and the right side of FIG. 6 illustrates table H6 that summarizes behavior which may be made by the robot 1 in the obstacle handling process.

In step S601 in FIG. 6, the robot 1 makes any behavior of "random travel", "approach to the user", "movement to the charger", and "movement in conversation". In step S602, the robot 1 detects an obstacle and thus stops in a predetermined distance to the obstacle. In step S603, the robot 1 distinguishes which of the user or an object the type of the obstacle corresponds to. Then, the robot 1 makes the behavior illustrated in table H6 in accordance with the behavior type in S601 and the type of the obstacle detected in S603.

As illustrated in the first row of table H6, in a case where the behavior type is "random travel" and where the obstacle is "user", the robot 1 performs "conversation inducing utterance" that encourages a user U1 to have conversation such as "play with me". This is for increasing opportunities of communication with the user U1 by utterance to the user U1 because the user U1 is found in the random travel and it is obvious that the user U1 is present around the robot 1. On the other hand, when the obstacle is "object", the robot 1 avoids the object. This is because the user U1 is not found in the random travel, it is unknown whether or not the user U1 is present around the robot 1, and it is difficult to have communication with the user U1.

As illustrated in the second row of table H6, in a case where the behavior type is "approach to the user" and where the obstacle is "user", the robot 1 performs "conversation inducing utterance". This is for increasing opportunities of communication with the user U1 by active utterance from the robot 1 to the user U1 because it is obvious that the user U1 is present around the robot 1. On the other hand, when the obstacle is "object", the robot 1 performs "obstacle removal inducing utterance" that encourages the user U1 to move the obstacle away such as "move the obstacle away". This is because it is obvious that the user U1 is present around the robot 1 and opportunities of communication with the user U1 are increased more by encouraging the user U1 to remove the obstacle than a case where the robot 1 simply performs behavior for avoiding the obstacle.

As illustrated in the third row of table H6, in a case where the behavior type is "movement to the charger" and where the obstacle is "user", the robot 1 performs "charging inducing utterance" that encourages the user U1 to return the robot 1 to the charger 2 such as "return me to the charger". This is because it is obvious that the user U1 is present around the robot 1 and opportunities of communication with the user U1 are increased more by being returned to the charger 2 by the user U1 than autonomous movement to the charger 2. On the other hand, in a case where the obstacle is "object", the robot 1 makes behavior for avoiding the object. This is because it is unknown whether or not the user U1 is present around the robot 1 and it is difficult to have communication with the user U1.

As illustrated in the fourth row of table H6, in a case where the behavior type is "movement in conversation" and where the obstacle is "user", the robot 1 performs "reaction utterance" such as "I am happy being beside you". This is for increasing opportunities of communication between the robot 1 and the user U1 by active utterance from the robot 1 to the user U1 because the user U1 and the robot 1 are already having conversation. On the other hand, in a case where the obstacle is "object", the robot 1 performs "obstacle removal inducing utterance". This is because the robot 1 is having conversation with the user U1, conversation with the user U1 is promoted by using presence of "object" as a trigger, and an increase in opportunities of communication between the user U1 and the robot 1 is thereby intended.

As illustrated in table H6, it may be understood that patterns in which the robot 1 and the user U1 do not communicate are two patterns that are the pattern of the first row and second column and the pattern of the third row and second column and in the patterns other than those, the robot 1 and user U1 have some kinds of communication and behavior of the robot 1 is controlled so as to increase opportunities of communication as much as possible. Note that in table H6, each of "conversation inducing utterance", "charging inducing utterance", "reaction utterance", and "obstacle removal inducing utterance" is one example of first behavior that increases opportunities of interaction with the user U1. Further, "avoidance" corresponds to one example of second behavior for handling an obstacle.

As described above, in this embodiment, switching is made between the first behavior for increasing opportunities of interaction with a user and the second behavior for avoiding an obstacle in accordance with the behavior type of the robot 1 in detection of an obstacle and the type of the obstacle. Thus, in this embodiment, an obstacle may be avoided while opportunities of communication between the robot 1 and the user are increased as much as possible.

Note that the present disclosure may employ the following modification examples.

(1) In this embodiment, a description is made while children and parents are together categorized as users. However, this is one example, and the main controller 107 may change utterance contents of the robot 1 in the above-described obstacle handling process in a case where the user is a child and a case where the user is a parent. In this case, the main controller 107 may determine whether the user is a parent or a child from the attribute information of the user (for example, a user ID, an age, and so forth) included in the video analysis results acquired from the video processor 102.

For example, in the above-described "conversation inducing utterance", in a case where the user is a child, the main controller 107 conducts utterance such as "play with me" as described above. Accordingly, opportunities of communication between the robot 1 and the child may be increased as much as possible.

On the other hand, in a case where the user detected in "random travel" is a parent, the main controller 107 outputs the behavior control command, by which the robot 1 conducts utterance for inducing assistance for avoidance by the robot 1 such as "step aside", to the sound controller 114. Accordingly, the robot 1 may avoid the obstacle as an object while having communication with the parent.

Note that instead of utterance of "step aside", the main controller 107 may output the behavior control command that causes the robot 1 to perform a gesture which indicates that the robot 1 desires movement away from the robot 1. In this case, the main controller 107 may output the behavior control command for swaying the robot 1 in the left-right direction to the driving mechanism controller 116. For example, the main controller 107 may output the behavior control command for outputting the facial expression of a worried face to the display 111 to the display controller 112.

(2) An example where the contact information DB 131 is not utilized is described in the flow of FIG. 5. However, the present disclosure is not limited to this, and a handling method for an obstacle may be changed by utilizing the contact information DB 131. For example, it is assumed that in a case where the user is detected in step S204, the main controller 107 specifies the contact time between the detected user and the robot 1 in a predetermined period based on the contact information DB 131 and the contact time is a predetermined threshold value or greater. In this case, when the behavior type of the robot 1 is "random travel" or "approach to the user", the main controller 107 does not conduct "conversation inducing utterance" but may conduct behavior for avoiding the user. For example, in a case where sufficient contact time between the robot 1 and a child has already been spent, some parents possibly do not desire continuance of contact between the robot 1 and the child. Thus, the present disclosure causes the robot 1 to make behavior for avoiding the user in consideration of intention of such parents.

Specifically, in a case where it is determined that the obstacle is the user in step S204, the main controller 107 specifies the user ID of the concerned user from the attribute information of the user included in the video analysis results output from the video processor 102. Then, the main controller 107 requests the management unit 108 to perform a process for extracting the contact information of the concerned user in a specific past period (for example, one day, half a day, six hours, and so forth) from the present time from the contact information DB 131 and thereby acquires the contact information in the specific past period from the present time. Then, the main controller 107 uses the data stored in the column of "contact date and time" of the acquired contact information and thereby calculates the total contact time of the concerned user in the specific past time from the present time. Then, in a case where the total contact time is a predetermined threshold value or greater and where the present behavior type of the robot 1 is "random travel" or "approach to the user", the main controller 107 may output the behavior control command for avoiding the user to the driving mechanism controller 116.

Here, the contact time between the robot 1 and a child is used, but the present disclosure is not limited to this. For example, the main controller 107 may employ the contact frequency between the robot 1 and a child in a predetermined time. In a case where this mode is employed, the contact information DB 131 includes a column of the above-described "contact frequency". The main controller 107 uses the data stored in the column of "contact frequency" of the contact information of the concerned user in a specific past period from the present time, which is acquired from the management unit 108, and thereby obtains the total contact frequency of the concerned user in the specific past time. Then, in a case where the total contact frequency is a predetermined threshold value or greater, the main controller 107 may output the behavior control command for avoiding the user to the driving mechanism controller 116.

Further, the main controller 107 may utilize a facial expression, a sound, or a kind of an operation of a child in contact with the robot 1 and use positive expressions (for example, facial expressions such as "smiling face" and "surprised face", sounds such as "I like you" and "play more", operations such as "touching" and "stroking", and so forth) instead of the contact time.

In a case where this mode is employed, the main controller 107 refers to the data stored in the column of "contact content" of the contact information of the concerned user in a specific past period from the present time, which is acquired from the management unit 108, and thereby tallies the total number of pieces of contact information in which the positive expressions are stored. Then, in a case where the tallied total number is a predetermined threshold value or greater, the main controller 107 may output the behavior control command for avoiding the user to the driving mechanism controller 116.

(3) In step S201, in a case where detection of an obstacle and identification of the type of an obstacle are simultaneously performed, the time before the robot 1 stops may be changed in accordance with the type of the obstacle. For example, in a case where the type of the detected obstacle is the user and where the distance from the present position to the user is a predetermined separation distance or longer, in which the robot 1 is capable of interacting with the user, the main controller 107 outputs the behavior control command that causes the robot 1 to travel at a higher speed than a usual traveling speed to the driving mechanism controller 116. Then, when the robot 1 arrives at the position in a predetermined distance to the user, the main controller 107 outputs the behavior control command for stopping travel of the robot 1 to the driving mechanism control unit 116. Accordingly, the robot 1 may come close to the user at a higher speed than usual, and the robot 1 may be caused to behave as if the robot 1 were a pet that ran to the owner. On the other hand, in a case where the distance to the user is the predetermined distance or shorter when the user is detected, the main control unit 107 may output the behavior control command for stopping travel of the robot 1 to the driving mechanism control unit 116 and thereby stop travel of the robot 1 quickly.

(4) In the above embodiment, the robot 1 is the spherical robot illustrated in FIG. 1. However, the present disclosure is not limited to this, and a biped walking robot, a quadruped walking robot, a robot that moves by wheels, and so forth, which are other than the spherical robot, are possible.

A robot according to an exemplary embodiment of the present disclosure is useful for avoidance of an obstacle that is performed by a robot while opportunities of communication between a robot and a user are increased as much as possible.

What is claimed is:

1. A robot that mutually communicates with a user by interacting with the user, the robot comprising:
   a sensor that detects an obstacle;
   a memory; and
   a processor, wherein
   the memory stores a plurality of behavior types, each of the plurality of behavior types being a program for causing the robot to execute predetermined behavior,
   the memory further stores a behavior type, which is executed by the robot, among the plurality of behavior types, and the processor
determines, by referring to the memory, which of the plurality of behavior types the behavior type executed by the robot when the sensor detects the obstacle is,
determines a type of the obstacle detected by the sensor,
decides whether first behavior for increasing opportunities of interaction with the user or second behavior for avoiding the obstacle is performed, based on the behavior type executed by the robot when the sensor detects the obstacle and the type of the obstacle detected by the sensor, and
controls the robot to cause the robot to execute the decided behavior, wherein
in a case where the behavior type executed by the robot when the sensor detects the obstacle is behavior in which the robot moves toward a charging stand and the type of the obstacle detected by the sensor is an object other than the user,
the processor decides that the second behavior for avoiding the obstacle is performed.

2. The robot according to claim 1, wherein
in a second case where the behavior type executed by the robot when the sensor detects the obstacle is the behavior in which the robot moves toward the charging stand and the type of the obstacle detected by the sensor is the user,
the processor decides that the first behavior that indicates a desire for movement of the robot to the charging stand is performed.

3. A robot that mutually communicates with a user by interacting with the user, the robot comprising:
a sensor that detects an obstacle;
a memory; and
a processor, wherein
the memory stores a plurality of behavior types, each of the plurality of behavior types being a program for causing the robot to execute predetermined behavior,
the memory further stores a behavior type, which is executed by the robot, among the plurality of behavior types, and
the processor
determines, by referring to the memory, which of the plurality of behavior types the behavior type executed by the robot when the sensor detects the obstacle is,
determines a type of the obstacle detected by the sensor,
decides whether first behavior for increasing opportunities of interaction with the user or second behavior for avoiding the obstacle is performed, based on the behavior type executed by the robot when the sensor detects the obstacle and the type of the obstacle detected by the sensor, and
controls the robot to cause the robot to execute the decided behavior, wherein
in a case where the behavior type executed by the robot when the sensor detects the obstacle is behavior in which the robot moves at random and the type of the obstacle detected by the sensor is an object other than the user,
the processor decides that the second behavior for avoiding the obstacle is performed.

4. The robot according to claim 3, wherein
in a second case where the behavior type executed by the robot when the sensor detects the obstacle is the behavior in which the robot moves at random and the type of the obstacle detected by the sensor is the user,
the processor decides that the first behavior that induces conversation with the user is performed.

5. A control method of a robot that mutually communicates with a user by interacting with the user, the control method comprising:
detecting an obstacle by a sensor;
storing a plurality of behavior types in advance in a memory, each of the plurality of behavior types being a program for causing the robot to execute predetermined behavior;
storing a behavior type executed by the robot in the memory;
determining, by referring to the memory, which of the plurality of behavior types the behavior type executed by the robot when the sensor detects the obstacle is;
determining whether a type of the obstacle detected by the sensor is the user or an object other than the user;
deciding whether first behavior for increasing opportunities of interaction with the user or second behavior for avoiding the obstacle is performed, based on the behavior type executed by the robot when the sensor detects the obstacle and the type of the obstacle detected by the sensor; and
controlling the robot to cause the robot to execute the decided behavior, wherein
in a case where the behavior type executed by the robot when the sensor detects the obstacle is behavior in which the robot moves toward a charging stand and the type of the obstacle detected by the sensor is an object other than the user,
the control method decides that the second behavior for avoiding the obstacle is performed.

6. The control method according to claim 5, wherein
in a second case where the behavior type executed by the robot when the sensor detects the obstacle is the behavior in which the robot moves toward the charging stand and the type of the obstacle detected by the sensor is the user,
the control method decides that the first behavior that indicates a desire for movement of the robot to the charging stand is performed.

7. A control method of a robot that mutually communicates with a user by interacting with the user, the control method comprising:
detecting an obstacle by a sensor;
storing a plurality of behavior types in advance in a memory, each of the plurality of behavior types being a program for causing the robot to execute predetermined behavior;
storing a behavior type executed by the robot in the memory;
determining, by a processor by referring to the memory, which of the plurality of behavior types the behavior type executed by the robot when the sensor detects the obstacle is;
determining whether a type of the obstacle detected by the sensor is the user or an object other than the user;
deciding, by the processor, whether first behavior for increasing opportunities of interaction with the user or second behavior for avoiding the obstacle is performed, based on the behavior type executed by the robot when the sensor detects the obstacle and the type of the obstacle detected by the sensor; and
controlling the robot to cause the robot to execute the decided behavior, wherein
in a case where the behavior type executed by the robot when the sensor detects the obstacle is behavior in which the robot moves at random and the type of the obstacle detected by the sensor is an object other than the user, the control method decides that the second behavior for avoiding the obstacle is performed.

8. The control method according to claim 7, wherein in a second case where the behavior type executed by the robot when the sensor detects the obstacle is the behavior in which the robot moves at random and the type of the obstacle detected by the sensor is the user, the control method decides that the first behavior that induces conversation with the user is performed.

* * * * *